(12) United States Patent  
Hameed et al.

(10) Patent No.: US 8,874,821 B2
(45) Date of Patent: Oct. 28, 2014

(54) DETERMINATION OF A ZONED PORTION OF A SERVICE DELIVERY SYSTEM

(75) Inventors: Sohail Hameed, Houston, TX (US); Balaji Natrajan, Spring, TX (US); Michael G. Myrah, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 396 days.

(21) Appl. No.: 13/449,091

(22) Filed: Apr. 17, 2012

(65) Prior Publication Data

US 2013/0275648 A1 Oct. 17, 2013

(51) Int. Cl.
*G06F 13/42* (2006.01)
*G06F 15/173* (2006.01)
*G06F 11/00* (2006.01)

(52) U.S. Cl.
USPC ............ 710/316; 709/223; 709/224; 709/225

(58) Field of Classification Search
CPC ............................... G06F 15/173; G06F 11/00
USPC .................................. 710/316; 709/223–225
See application file for complete search history.

(56) References Cited

U.S. PATENT DOCUMENTS

| 7,502,865 | B2 | 3/2009 | Seto |
| 7,644,304 | B2 | 1/2010 | Kotzur et al. |
| 7,774,445 | B1 | 8/2010 | Weinbrecht et al. |
| 7,996,509 | B2 * | 8/2011 | Basham et al. ............... 709/223 |
| 8,069,229 | B2 * | 11/2011 | Yellapragada et al. ....... 709/221 |
| 8,074,105 | B2 | 12/2011 | Kalwitz et al. |
| 2010/0250785 | A1 | 9/2010 | Shin et al. |

OTHER PUBLICATIONS

Gibbons, Terry, "Sharable, Scalable SAS Infrastructure," Switched SAS, White Paper, Oct. 2010, 8 p.

* cited by examiner

*Primary Examiner* — Paul R Myers
*Assistant Examiner* — Christopher a Daley

(57) ABSTRACT

A first expander comprises a first PHY to be connected by a link to a second PHY of a second expander. The first expander is controlled by a first zone manager and the second expander is controlled by a second zone manager. The first zone manager is to determine whether the first zone manager is a link reset master. Based on the first zone manager being a link reset master and a first control bit corresponding to at least one of the first and second PHYs being set, the first zone manager initiates a reset of the link interconnecting the first and second PHYs. The first control bit is indicative of whether the second expander intends to be included in a zoned portion of a fabric.

20 Claims, 5 Drawing Sheets

DETERMINATION OF A ZONED PORTION OF A SERVICE DELIVERY SYSTEM

BACKGROUND

In a network fabric, such as a Serial-Attached Small Computer System Interface (SAS), the number of devices that can be attached to the fabric depends on various factors. One such factor is the number of ports present on a switch used in the fabric. To increase the number of devices that can be attached to the fabric, a switch with a greater number of ports may be used. Such higher capacity switches may not always be available. Another option is to trunk two or more switches together to provide more ports for connecting devices.

BRIEF DESCRIPTION OF THE DRAWINGS

For a detailed description of various examples, reference will now be made to the accompanying drawings in which.

DETAILED DESCRIPTION

Some networks, such as SAS networks, permit ports to be zoned together. For example, one port may be zoned to another port which means that devices connected to such ports can communicate with each other but not to devices connected to other ports that are not part of the same zone. SAS networks provide for a Zoned Portion of a Service Delivery System (ZPSDS) which identifies the SAS expanders that are zoning-enabled, have at least one port that is part of a zone, follow common zoning rules and have the same meaning of zone group identifiers throughout the zone portion. A ZPSDS is a zoned portion of a fabric that comprises a group of zoning-enabled expanders that cooperate to control access between PHYs.

Part of the process of initialization of a fabric is to create the ZPSDS. Creating the ZPSDS means to identify the ports that are part of the ZPSDS. A discovery process identifies the expanders that are to be included in the ZPSDS. One or more expanders (e.g., the expanders included in a switch) may be controlled by a zone manager. A different group of expanders (e.g., expanders in different switches) may be controlled by a different zone manager. The process of creating the ZPSDS may not function correctly when attempting to extend a ZPSDS between expander domains (i.e., expanders controlled by different zone managers). The embodiments described herein address this issue and enable a ZPSDS to be extended across expander domains having their own zone managers. An example is provided of two switches that are trunked together. For a pair of trunked switches, a port of one switch is dedicated for connection to a port of another switch. Each switch uses its own zone manager. An example is described as to how the zone managers are coordinated to extend the ZPSDS across the trunked switches. However, the principles discussed herein apply to any context in which a ZPSDS is extended between two or more expander domains—each expander domain having at least one expander and its own zone manger. The principles of this disclosure also apply to network fabrics other than SAS fabrics.

FIG. 1 illustrates an example of a fabric 100. The fabric 100 may also be referred to as a network or as a system. The fabric 100 of FIG. 1 may be implemented in the form of SAS-compliant devices and switches. While reference to SAS devices, SAS switches, SAS expanders and the like is made herein, fabrics other than those containing SAS-specific devices are possible as well.

Figure 1A:
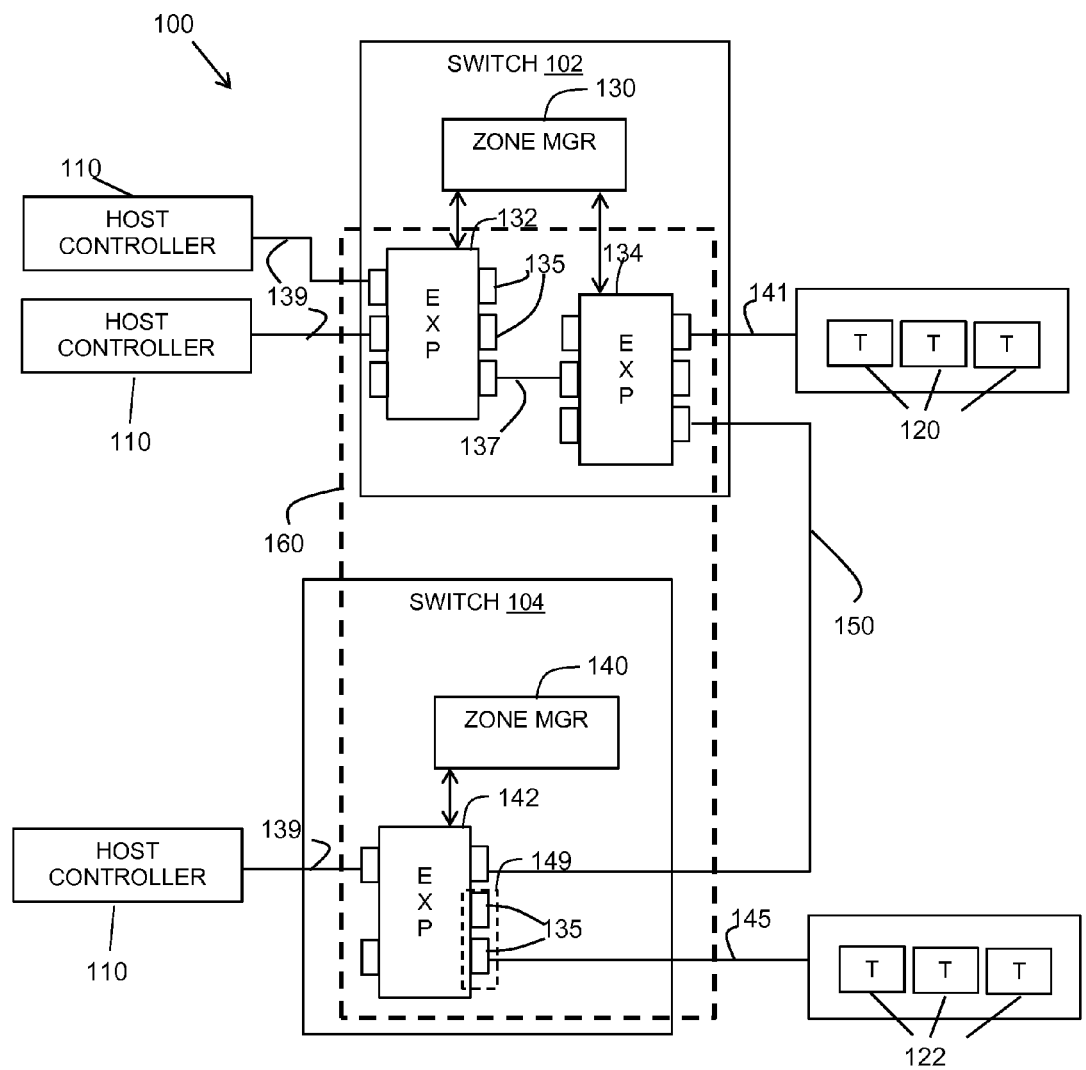
FIG. 1A shows a system in accordance with an illustrative example.

In the example of FIG. 1A, the SAS fabric 100 includes a pair of switches 102 and 104, trunked together, as well as host controllers 110 and target devices 120 and 122. The target devices 120, 122 may comprise storage devices, but may comprise other types of devices as well. The host controllers 110 initiate transactions destined for the target devices 120, 122. For example, the host controller 110 may initiate write or read transactions to write data to or read data from the target devices 120, 122. The transactions between the host controllers 110 and the target devices 120, 122 may include messages, data packets, and the like passed back and forth between host controller 110 and target device 122, 122 through one or more of the switches 102, 104.

Each switch 102, 104 includes one or more expanders. Switch 102 includes two expanders 132 and 134, while switch 104 includes a single expander 142. A different number of expanders from that shown in FIG. 1 can be included in each switch as desired. Each expander 132, 134, 142 includes one or more ports 135, and each port includes one or more PHYs 135 (physical interface). An example of a port 14 is shown on expander 142 A PHY may include a transmitter and a receiver and connects to a corresponding receiver and transmitter of another PHY to implement a bi-directional serial link between the PHYs. Link 137 connects together the PHYs of ports of expanders 132 and 134 as shown in FIG. 1A. Links 139 connect PHYs of ports on expanders 132 and 142 to the corresponding controllers 110. Link 141 connects expander 134 to target devices 120, while link 145 connects expander 142 in switch 104 to target devices 122. Switch 102 is trunked to switch 104 by way of link 150. Trunking the switches 102 and 104 together enables a larger number of ports to be available for additional host controllers and target devices to be networked together.

Figure 1B:
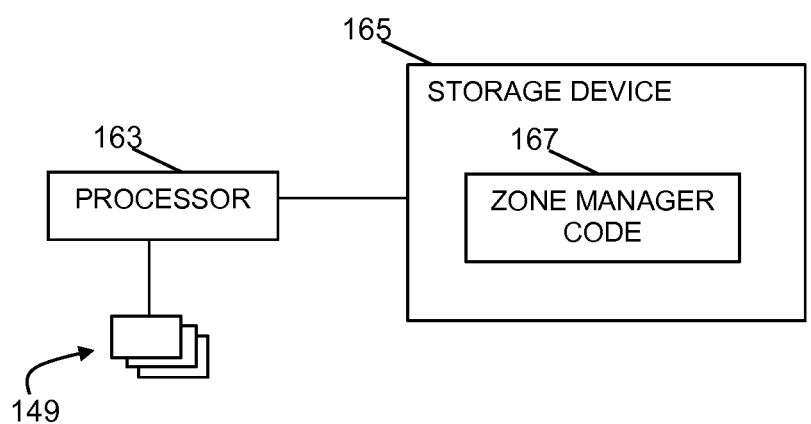
FIG. 1B shows a hardware diagram of an implementation of a zone manager in accordance with an illustrative example.

Each switch 102, 104 is associated with a zone manager. Zone manager 130 is associated with switch 102, and zone manager 140 is associated with switch 104. In some implementations, each zone manager comprises executable code that executes on a processor. Each zone manager may be executed by a processor contained in the respective switch, or by a processor external to the switch. FIG. 1B, for example, shows a processor 163 coupled to a non-transitory storage device 165 (e.g., random access memory, hard disk drive, Flash storage, etc.) and one or more ports 149. The storage device contains zone manager code 167 that is executable by the processor 163 to imbue the processor with some or all of the functionality described herein. In either case, each zone manager 130, 140 controls the expanders in the corresponding switch. Thus, zone manager 130 controls expanders 132, 134, and zone manager 150 controls expander 142. Controlling an expander by a zone manager includes, for example, extending the ZPSDS, zoning initiator (e.g., host controller 110) and targeted PHYs, processing the changes in the fabric, etc.

At least one of the functions performed by a zone manager is to extend the ZPSDS for the fabric 100 when new expanders are attached to the fabric. Because multiple zone managers 130, 140 are present in the example of FIG. 1A, coordination between the zone managers 130, 140 helps to ensure an accurate and reliable extension of the ZPSDS between the two switches 102, 104. The resulting ZPSDS 160 is shown in dashed outline in the example of FIG. 1A. The expanders included in the ZPSDS 160 have zoning enabled and are configured to have various groups of ports zoned together.

Each expander 132, 134, 142 maintains various bits for each PHY in each of its ports. An Inside ZPSDS (IZ) bit indicates whether or not the PHY is part of the ZPSDS. For example, a PHY's IZ bit set to 1 may mean that PHY is part of the same ZPSDS to which an expander that is attached to the PHY is part of, whereas a 0 for the IZ bit for a given PHY may mean that the PHY is not part of the ZPSDS.

A Requested Inside ZPSDS bit (RIZ) bit indicates whether or not the corresponding PHY is requesting to be part of the ZPSDS. In some implementations, the RIZ bits of connected expander PHYs are exchanged as part of a SAS IDENTIFY frame during a link reset sequence. A PHY of an expander that desires to join the ZPSDS has its RIZ bit set to, for example, 1 and the RIZ bit is transmitted to a connected expander's PHY. The receiving expander receives the RIZ bit and determines that the expander that sent the RIZ bit is requesting to become part of the ZPSDS. The PHYs of the connected expanders exchange their RIZ bits to indicate to each other their intent to become part of the ZPSDS.

Each PHY can also be assigned to a zone group. Upon system initialization, the zone group of each PHY is set to 0 (no access) by default. Zone group 0 means that the switches will not be able to discover each other beyond their immediate neighbors. In order to discover the entire topology of the fabric 100, the RIZ and IZ bits are manipulated to gradually extend the ZPSDS until it spans through the entire fabric and all switches in the fabric are discovered. This process involves switch discovery and ZPSDS extension operations.

One implementation of a discovery process is as follows. When a device in the fabric is initialized, such as a zone manager, an expander or an initiator one of the first things the device does is to discover the topology of the fabric. In order to discover the topology, the device sends a particular command to each of its expanders. The command, for example, may be the SMP DISCOVER LIST command. The response received from the SMP DISCOVER LIST command provides an identification of the devices (e.g., controllers, target devices, other switches, expanders, etc.) immediately connected to the device.

If all of the devices which are connected are end devices, such as host controllers 110 and target devices 120, 122, but not other switches, the discovery process is complete. However, if any of the PHYs are found to be connected to another expander, then an SMP DISCOVER LIST command may be sent to that newly discovered expander to determine the devices attached to that expander. This process continues until the entire topology of the fabric is discovered.

In an example in which two switches are trunked together, a zone manager may determine that its corresponding switch is trunked to another switch. In such a case, there are two possible scenarios. If the entire topology is just powered up, then the expander in the trunked neighboring switch is also just powered up and hence the IZ and RIZ bits on all attached PHYs of the corresponding PHYs are set to 0 according to the SAS protocol. Accordingly, any command attempting to pass beyond the expander connected to the trunked switch will be rejected. Therefore, if an expander is discovered to be part of a connected (e.g., trunked) switch, an SMP DISCOVER LIST command cannot be sent to that remote expander to discover its local topology.

Another possible scenario is that the neighbor switch expander was already powered up and its RIZ bit may already be set to 1 by its local zone manager to indicate its intention to be part of the ZPSDS. As a result, when the current switch expander is powered up, the link reset between the PHYs of those expanders will cause the IZ bit to be set to 1. In this case, the discovery of devices beyond the expander continues and the ZPSDS will include the expanders of both switches.

In the former scenario when the IZ bit is set to 0, discovery simply stops. However, in accordance with various embodiments, the ZPSDS is extended as explained below to include the neighbor switch's expander(s). Once the ZPSDS is extended, the link between the switches is reset which triggers another discovery cycle. This time the IZ bit will be a 1 and discovery beyond the neighboring switch's expander thus will occur.

An illustrative process for extending the ZPSDS to include an expander controlled by a separate zone manager is as follows. If, during the discovery process, an expander discovers that it is connected to another switch's expander via a PHY which has its IZ bit set to 0, the discovering switch's zone manager performs a ZPSDS extension process such as that shown in FIG. 2.

Figure 2:
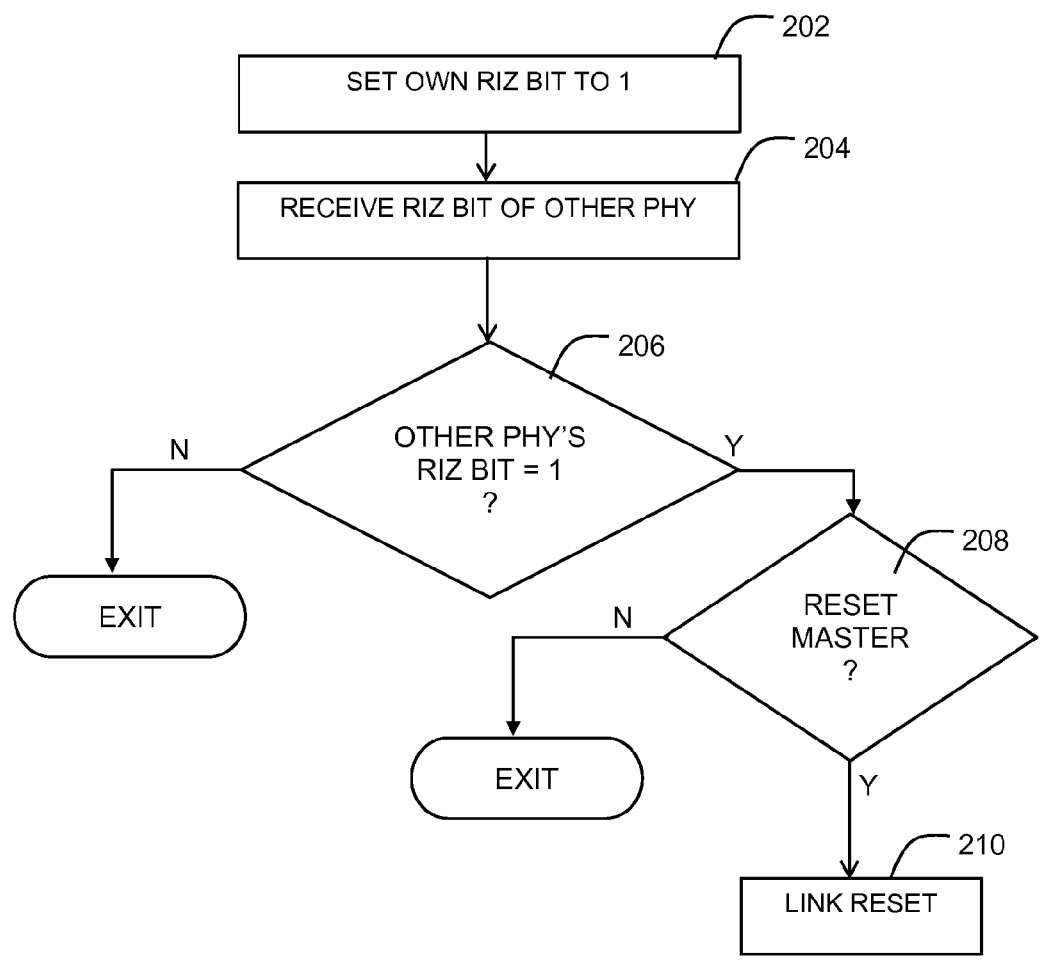
FIG. 2 shows a method in accordance with an illustrative example.

The actions shown in FIG. 2 may be performed by the zone managers 130, 140 of the relevant switches 102, 104 and can be performed in the order shown or in a different order. Both zone managers may perform the process of FIG. 2.

At 202, the RIZ bit of the relevant PHY is set to 1 to indicate that that PHY is to be included in the ZPSDS. At 204, the RIZ bit of the connected PHY is received. The received RIZ bit may be received by way of an IDENTIFY frame. At 206, the method determines whether the received RIZ bit is 1. If not, the process ends. If the received RIZ bit is a 1, which indicates that the connected PHY intends to be included in the ZPSDS, the process continues at 208 to determine which zone manager is the "reset master." An example of how the switches determine which zone manager is the reset master are provided below. The switches agree among themselves as to which zone manager is the reset master. In this implementation, only one zone manager in a pair of connected switches is a reset master. If the particular zone manager performing the method of FIG. 2 is the reset master, as determined at 208, that zone manager resets the link at 210; otherwise if the zone manager is not the reset master, the process exits.

Resetting the link may be performed by the reset master zone manager issuing a LINK RESET frame. LINK RESET may be a combination of special signaling protocol, speed negotiation and exchange of IDENTIFY frame. It can be initiated by a zone manager on any PHY using SMP PHY CONTROL command with operation set to LINK RESET.

Figure 3:
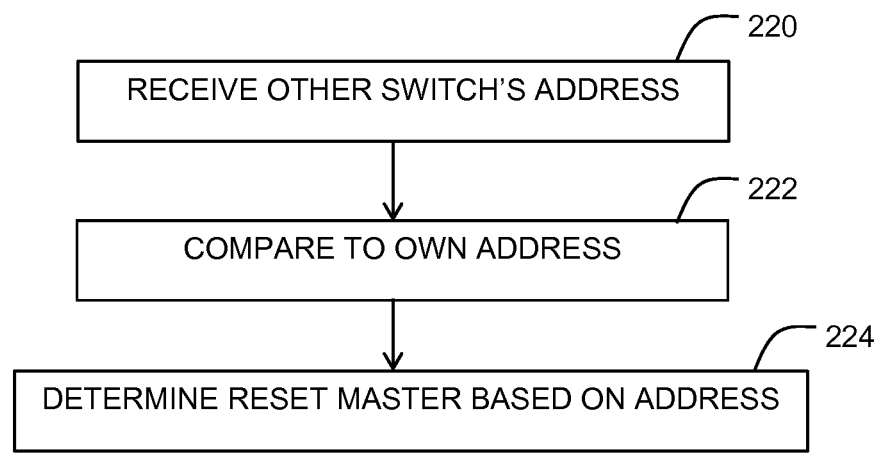
FIG. 3 shows a method of determining which zone manager is to function as a reset master in accordance with an illustrative example.

Each zone manager has an assigned unique SAS address. One way to determine which zone manager is the reset master is illustrated in the example of FIG. 3. The method of FIG. 3 includes each switch (e.g., its zone manager) receiving the address of the other connected switch at 220. The switches may exchange addresses as part of the IDENTIFY frames exchanged at power-up. At 222, each switch compares its own address to that received from the connected other switch. At 224, each switch determines which switch is to function as the reset master based on the addresses. In one example, whichever switch has the lower (or higher) address is the reset master.

As shown in FIG. 2 and explained above, both zone managers of the trunked switches perform the process shown.

Only one zone manager will be determined to be the reset master, and that particular zone manager will reset the link between the two switches only if both RIZ bits are 1 indicating both switches are to be included in the ZPSDS. When the link is reset with both RIZ bits set to 1, then the ZPSDS will be extended to include the expanders of both switches as explained above.

Figure 4:
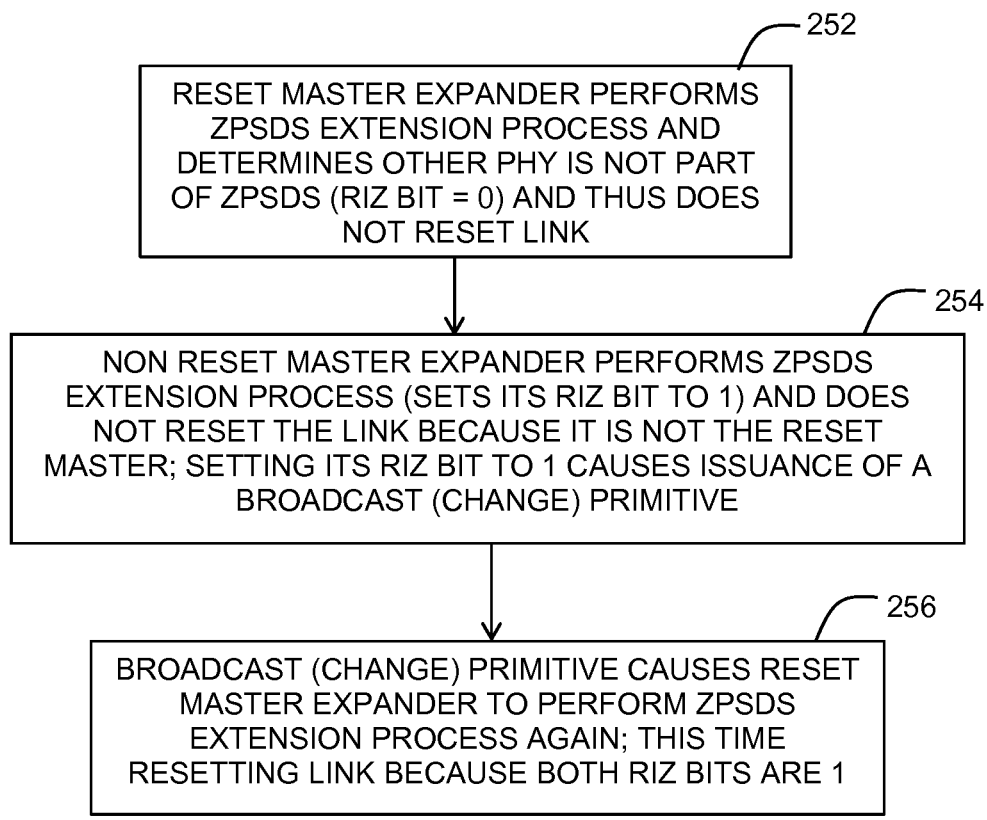
FIG. 4 shows a time sequence for resetting a link interconnecting expanders controlled by different zone managers in accordance with an illustrative example.

However, each zone manager in switches 102, 104 may act somewhat asynchronously with respect to the other zone manager meaning that the zone managers may not set their RIZ bits to 1 at the same time. The process of FIG. 2 handles this situation and causes the ZPSDS to be extended between the switches only after determining (and waiting if necessary) that the RIZ bits of both switches are 1. FIG. 4 illustrates this point.

FIG. 4 illustrates a time sequence of events 252, 254, and 256. At 252, the zone manager that is deemed to be the reset master performs the ZPSDS extension protocol of FIG. 2 and determines that the other connected PHY is not part of the ZPSDS because that PHYs RIZ bit is 0. Thus, the reset master does not reset the link.

It may be that the non-reset master zone manager simply has not had time yet to set the RIZ bit of the relevant expander PHY to 1 to indicate that it is to be part of the ZPSDS. At 254 and at a later point in time, the zone manager that is not the reset master performs the ZPSDS extension protocol of FIG. 2 and sets the RIZ bit of the relevant expander to 1. The non-reset master zone manager does not reset the link because it is not the reset master. However, setting the RIZ bit of the relevant expander PHY to 1 causes the switch to issue a BROADCAST (change) PRIMITIVE. Such a primitive is broadcast whenever a configuration change is detected. The primitive alerts the expanders and other devices in the fabric 100 including the other zone manager that a change has occurred. Receipt of a BROADCAST (change) PRIMITIVE causes a new round of discovery to occur.

When the reset master zone manager receives the BROADCAST (change) PRIMITIVE, that zone manager again perform the ZPSDS extension protocol of FIG. 2. This time reset master zone manager detects the RIZ bit of the connected non-reset master expander PHY to be 1 and, as a result, resets the link. Upon resetting the link, the RIZ bits of both involved expander PHYs are 1. With both RIZ bits set to 1, the IZ bit of both PHYs is set to 1, and the ZPSDS will be extended to include the expanders of both switches.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
receiving, by a first zone manager that controls a first expander, a first control bit from a PHY of a second expander, said second expander controlled by a second zone manager;
determining whether the received first control bit indicates intent of the second expander for inclusion in a zoned portion of a fabric;
determining whether the first zone manager is a reset master;
based on the first zone manager determined to be the reset master, initiating, by the first zone manager, reset of a link interconnecting a PHY of the first expander with the PHY of the second expander; and
based on the first zone manager not being the reset master, not resetting the link by the first zone manager.

2. The method of claim 1 wherein the first control bit comprises a Requested Inside Zoned Portion of a Service Delivery System (RIZ) bit.

3. The method of claim 1 further comprising setting a second control bit by each expander to designate each PHY as being included in the zoned portion after initiating reset of the link.

4. The method of claim 3 wherein the second control bit comprises an Inside Zoned Portion of a Service Delivery System (IZ) bit.

5. The method of claim 1 wherein determining whether the first zone manager is the reset master comprises determining whether the first zone manager is a reset master of the link instead of the second zone manager.

6. The method of claim 5 wherein determining whether the first zone manager is the reset master is based on addresses.

7. The method of claim 1 wherein determining whether the first zone manager is the reset master is based on addresses assigned to the first and second zone managers.

8. The method of claim 1 wherein the zoned portion comprises a group of zoning-enabled expanders that cooperate to control access between a plurality of PHYs.

9. A system, comprising:
a first expander comprising a first PHY to be connected by a link to a second PHY of a second expander, said first expander controlled by a first zone manager and the second expander controlled by a second zone manager;
wherein the first zone manager is to determine whether the first zone manager is a link reset master and, based both on the first zone manager being a link reset master and a first control bit corresponding to at least one of the first and second PHYs being set, the first control bit indicative of whether the second expander intends to be included in a zoned portion of a fabric, the first zone manager initiates a reset of the link interconnecting the first and second PHYs.

10. The system of claim 9 wherein, based on the first zone manager determining the first zone manager is not a reset master, the first zone manager does not initiate the reset of the link.

11. The system of claim 9 wherein based on the first control bit not being set the first zone manager does not initiate the reset of the link.

12. The system of claim 9 wherein the first zone manager determines that the first zone manager is the link reset master based on addresses of the first and second zone managers.

13. The system of claim 9 wherein the first zone manager initiates reset of the link followed by setting a second control bit to designate the first PHY as being included in the zoned portion.

14. The system of claim 13 wherein the second control bit comprises an Inside Zoned Portion of a Service Delivery System (IZ) bit.

15. The system of claim 13 wherein the first control bit comprises a Requested Inside Zoned Portion of a Service Delivery System (RIZ) bit.

16. A non-transitory storage device containing executable code that, when executed by a processor, causes the processor to:
receive at a first PHY a first control bit from a second PHY, said first and second PHYs in separate expander domains;
determine whether the first control bit indicates intent of a second expander to be included in a zoned portion of a fabric;

determine whether the processor is to operate as a reset master;
based on the processor determined to be the reset master, initiate reset of a link interconnecting the PHYs; and
based on the processor not being the reset master, not reset the link.

17. The non-transitory storage device of claim 16 wherein the zoned portion comprises a zoned portion of a service delivery system (ZPSDS).

18. The non-transitory storage device of claim 16 wherein the code causes the processor to determines whether the processor is the reset master based on addresses of expanders containing the first and second PHYs.

19. The non-transitory storage device of claim 16 wherein the code causes the processor to set a second control bit to designate the first PHY as being included in the zoned portion after reset of the link is initiated.

20. The non-transitory storage device of claim 16 wherein the code causes the processor to initiate reset of the link by generating a link reset frame.

* * * * *

UNITED STATES PATENT AND TRADEMARK OFFICE
CERTIFICATE OF CORRECTION

PATENT NO.         : 8,874,821 B2  
APPLICATION NO.    : 13/449091  
DATED              : October 28, 2014  
INVENTOR(S)        : Sohail Hameed et al.

Page 1 of 1

It is certified that error appears in the above-identified patent and that said Letters Patent is hereby corrected as shown below:

In the Claims

In column 7, line 11, in Claim 18, delete "determines" and insert -- determine --, therefor.

Signed and Sealed this
Thirty-first Day of March, 2015

Michelle K. Lee
*Director of the United States Patent and Trademark Office*